Figure 1:
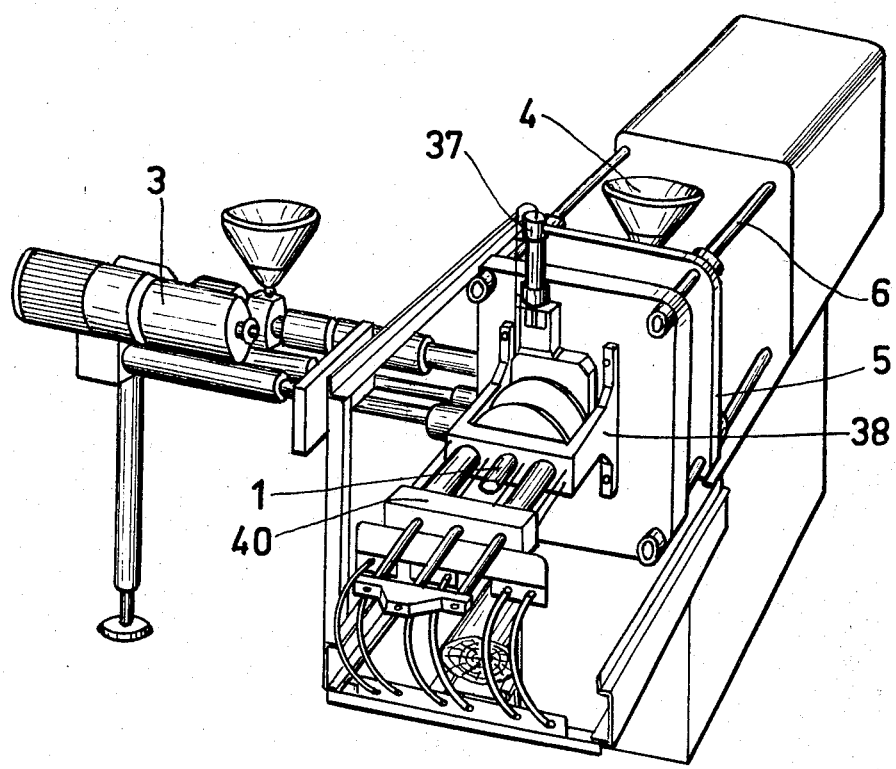

United States Patent [19]
Svanfos

[11] 3,773,450
[45] Nov. 20, 1973

[54] ARRANGEMENT AT INJECTION MOULDING MACHINE FOR RENDERING POSSIBLE MULTI-COMPONENT MOULDING

[76] Inventor: Soren Baltsar Egon Svanfors, Nils Gustafsgatan 25, Gislaved, Sweden

[22] Filed: Dec. 6, 1971

[21] Appl. No.: 204,924

Related U.S. Application Data

[63] Continuation of Ser. No. 808,966, March 20, 1969, abandoned.

[52] U.S. Cl.................. 425/130, 425/150, 425/195, 425/192
[51] Int. Cl.............................................. B29f 1/12
[58] Field of Search.................... 425/130, 246, 134, 425/150

[56] References Cited
UNITED STATES PATENTS 3,435,483   4/1969   Heiner et al.................... 425/192 X
3,319,300   5/1967   Hehl .............................. 425/130 X

FOREIGN PATENTS OR APPLICATIONS 1,072,799   1/1960   Germany ........................... 425/130

Primary Examiner—J. Spencer Overholser
Assistant Examiner—David S. Safran
Attorney—Holman, Glascock, Downing & Seebold

[57] ABSTRACT

Apparatus for the molding of multicomponent parts by injection molding. One mold half is rotated so as to present a number of mold cavity sections to successive positions at which different colors or materials are injected. All of the colors or materials are injected simultaneously at their respective locations, and after a mold cavity section has received material from all of the injectors, the finished article is ejected. The rotation mechanism consists of a rack and gear that is actuated in response to the ejection of the finished article.

1 Claim, 6 Drawing Figures

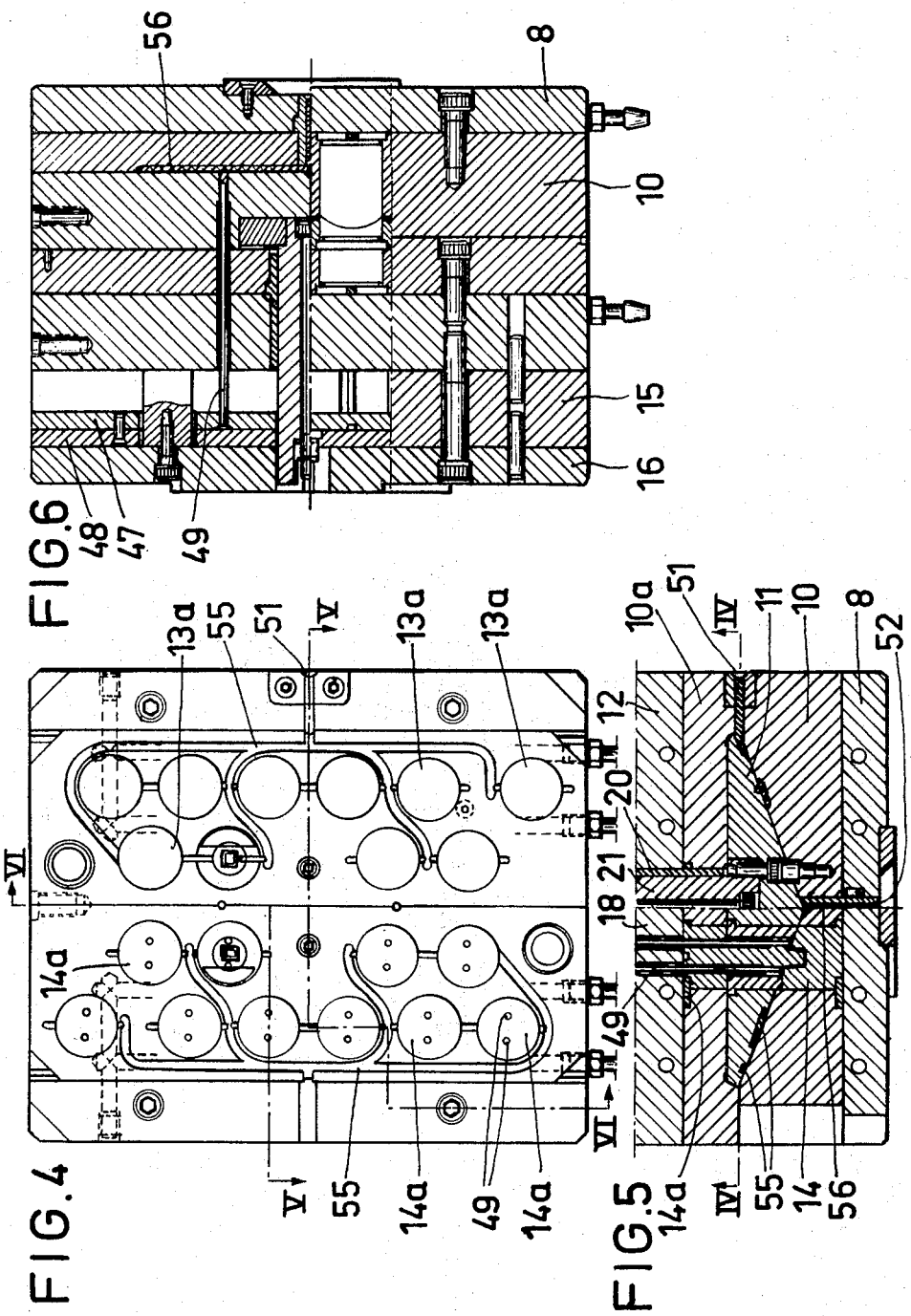

ARRANGEMENT AT INJECTION MOULDING MACHINE FOR RENDERING POSSIBLE MULTI-COMPONENT MOULDING

This application is a continuation of U.S. Pat. application Ser. No. 808,966 filed Mar. 20, 1969, now abandoned.

This invention relates to an arrangement at injection moulding machines for rendering possible multi-component moulding, for example injection moulding of details preferably of plastic consisting of different materials or same materials but of different colours, in one and the same machine. Heretofore, details of this kind have been manufactured in different steps by using at least two machines, in such a manner, that the outer portion of the details is made in one machine and the subsequent injection of the other material or materials is carried out in separate machines. This method is not only time-consuming, because the product semimanufactured in the first machine has to be transferred and fitted to the tools of the second machine, but it also involves high tool costs, because for every series at least two tools have to be manufactured.

A further disadvantage is that the machine, which is used for the injection moulding of the outer portion of the details, cannot be utilized in an economically satisfactory way, due to the fact, that the injection moulding of the outer portion is carried out considerably faster than the injection of the other material. This results after a relatively short time in a large stock of outer portions, which easily can be damaged by dust collection, shrinkage etc., if they are stored for too long a time. For preventing this stock of semimanufactured products from becoming too large, several machines must be applied for the subsequent injection or, alternatively, the first machine has to remain inoperative for long periods.

These and other disadvantages are eliminated entirely by the arrangement according to the invention which was given the characterizing features defined in the claims.

Figure 2:
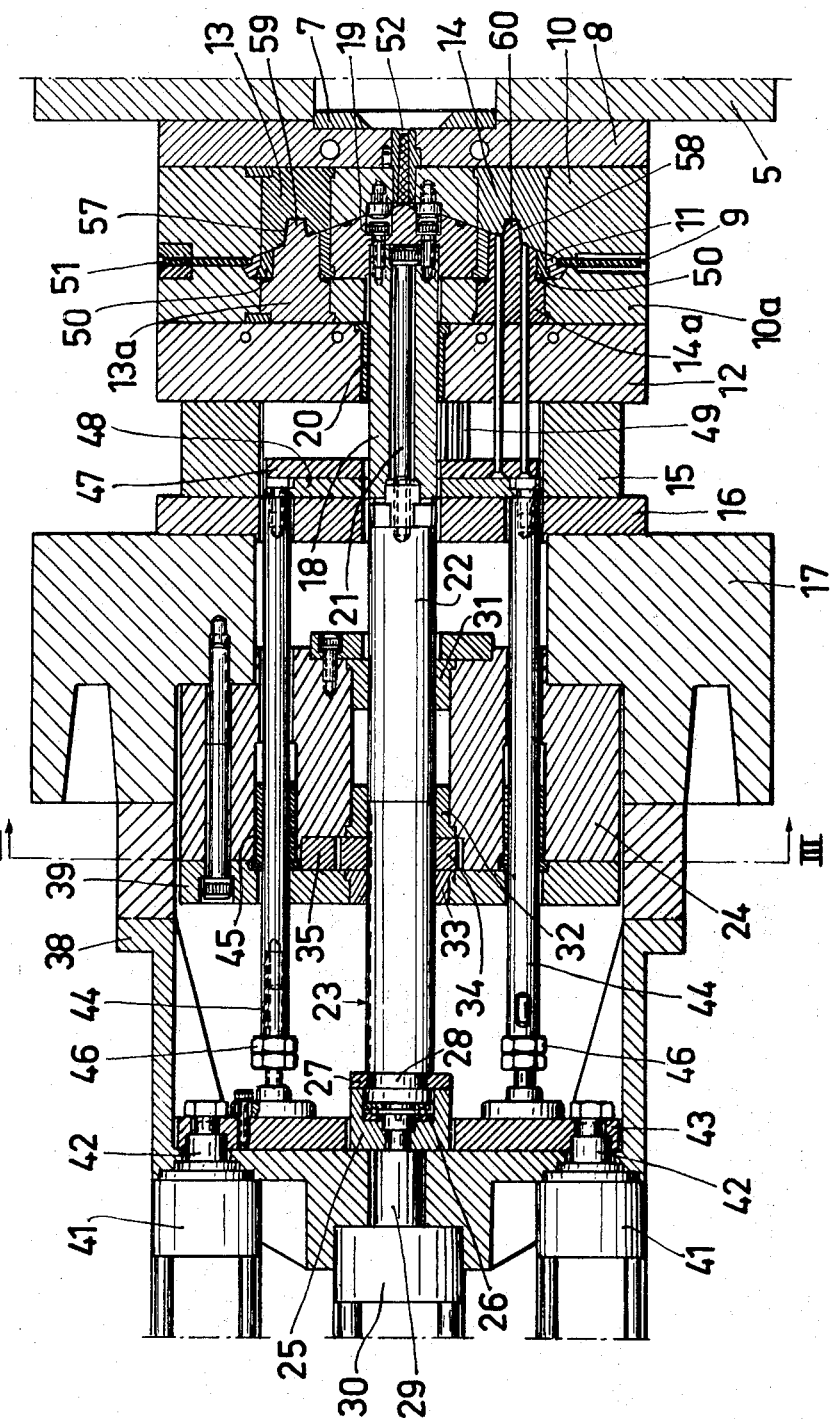
Figure 3:
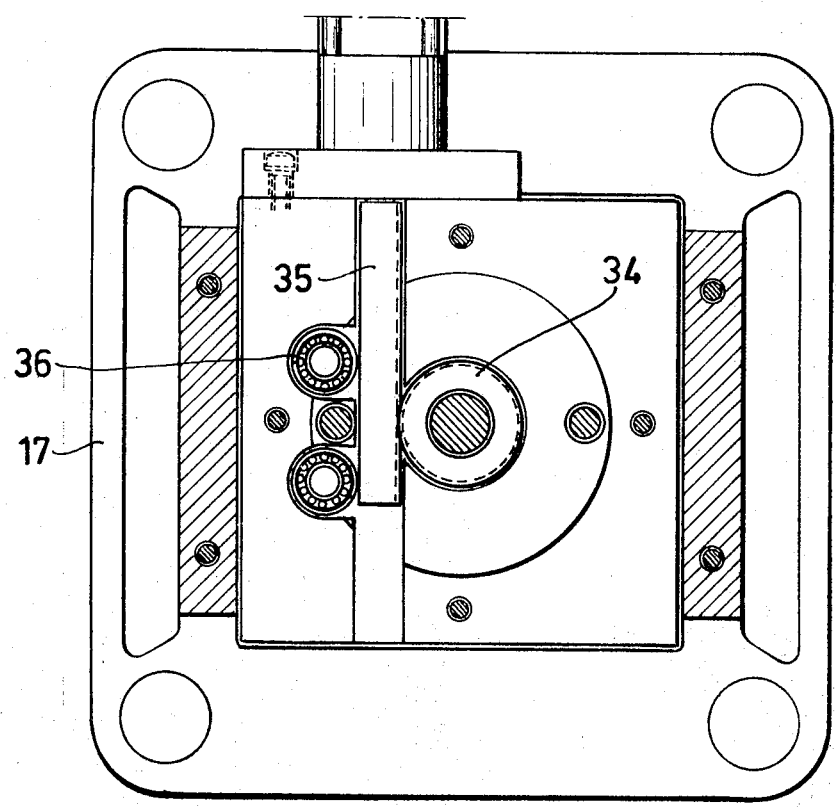

The invention is described in the following greater detail, with reference to the accompanying drawings showing by way of example a selected embodiment. FIG. 1 shows a perspective view of an injection moulding machine according to the invention, FIG. 2 is a longitudinal section through part of the machine, FIG. 3 is a section along the line III—III in FIG. 2, FIG. 4 shows a transverse view along the line of partition marked by IV—IV in FIG. 5, through the mould used at the embodiment shown, FIG. 5 is a section along the line V—V in FIG. 4, and FIG. 6 is a section along the line VI—VI in FIG. 4.

The injection moulding machine shown in FIG. 1 is particularly adapted for moulding such keys for calculating machines which show figures in a colour different from that of the shell proper. For this purpose the machine has been provided with a special tool or mould, which will be described in greater detail in connection with FIGS. 2–6. The injection moulding machine further comprises a mould closing mechanism 1, an ejector mechanism 2, two injection units 3 and 4, thereof one unit for every material (colour), which units are placed at an angle of 90° in relation to one another, and necessary hydraulic and/or pneumatic and electric equipment, which is not shown in the Figures. The injection units 3 and 4 as well as said equipment being of known construction and not being part of the invention, they will not be described in greater detail.

5 designates a platen rigidly mounted on four rods 6 (FIG. 1) and provided with a centering plate 7 for the nozzle of unit 4. To the platen 5 is fastened a holding plate 8 for the tripartite mould or tool generally designated by 9 which comprises two insert plates 10 and 10a, movable mould part 11 and a support plate 12. In the insert plates, the mould inserts 13 and 14 and 13a and 14a, respectively, are arranged. The plate 12 is connected via a distance member 15 with the mould holding plate 16 located at the ejector side, said plate 16 being locked to the axially movable platen 17 of the machine. When the mould is opened by moving the axially movable platen 17, thus, the mould inserts 13a and 14a fastened to the insert plate 10a as well as the mould part 11 will remove from the fixed insert plate 10.

The mould part 11 in its turn is by screws 19 rigidly connected with a jointing or distance shaft 18, which is mounted in a sleeve 20 in the support plate 12 and by a screw 21 nonrotatably secured at a shaft 22 provided with ridge grooves 23, teeth or the like, said shaft 22 extending through the platen 17 and through a housing 24, which is provided at the platen, all the way to a sleeve 25. Said sleeve 25 carries an end bearing 26 for the shaft 22 and is by a screw or the like connected with a piston rod 29 for a hydraulic transport cylinder 30. To the sleeve 25 is fastened a locking ring 27, which by co-operation with a groove 28 in the shaft 22 locks the shaft to the sleeve 25.

In the housing 24 three sleeves 31, 32 and 33 but are arranged for bearing the shaft 22, that the shaft 22 together with the jointing shaft 21 can be turned and moved in axial direction, if so is required. The motion of the shaft is effected by the hydraulic cylinder 30, the turning of the shaft 22 being effected by a hydraulically operated indexing means for the mould part 11, which means is located in the housing 24. Said indexing means comprises a gear wheel 34 mounted on that part of shaft 22 which is provided with ridge grooves, in relation to which wheel the shaft can be moved by not turned. The gear wheel 34 is fixed in its position by the sleeves 32 and 33, which are arranged in the cover plate 39. With said gear wheel 34 co-operates a rack 35 mounted movably in a groove in the housing 24 by assistance of ball bearings 36 (FIG. 3). The rack 35 for turning the shaft 22 through a certain angle is drive by a hydraulic cylinder 37, which is started via impulses from an end contact (not shown) on the transport cylinder 30 when the latter has reached a certain position.

At the platen 17 is mounted a yoke-shaped holder 38, which encloses the housing 24 with the cover plate 39 and which, in addition to the transport cylinder 30, together with a block 40 (FIG. 1) carries two hydraulic ejector cylinders 41, which are located each on its side of the cylinder 30, and the piston rods 42 of which are connected with each other by a disc 43. With said disc are connected two ejector rods 44, which are adapted to be adjusted (at 46) with respect to their length, as appears from FIG. 2. The rods 44 extend through the housing 24 and platen 17, are controlled by sleeves 45, which are arranged in said housing and connected at their other ends with each other by ejector plates 47 and 48, which plates are connected with each other and ejector pins 49 are fastened to said plates.

As already mentioned, the mould 9 used in the embodiment shown is intended for the moulding of keys, for example for a calculating machine, and it comprises the fixed insert plate 10 at which the mould inserts or female mould parts 13 and 14 (in this case ten on each side of the line of symmetry of the mould) are arranged, further the insert plate 10a connected with the plate 12, at which insert plate the male mould parts 13a and 14a are arranged, and further the mould part 11, which is fastened on the jointing shaft 21 and in the open state of the mould adapted to be turned in relation to the insert plates 10 and 10a, said mould part 11 being provided with sleeve-like inserts 50 for controlling the male mould parts. The mould 9 further is provided with two inlets 51 and 52, thereof one (51) for the injection unit 3 and one (52) for the injection unit 4. The insert plate 10 and the mould part 11 include grooves 55 and 56 to form distribution channels from the inlet 51 and 52, respectively, to the mould spaces 57 and 58 formed by the female and male mould parts. Said grooves 55 and 56 are so arranged that the mould spaces 57 in closed state of the mould communicate only with the inlet 51 for the injection unit 3, and the mould spaces 58 communicate with the inlet 52 for the injection unit 4. As shown in FIG. 2, the mould spaces 57 located in the right-hand mould half (shown at the top of the Figure) are smaller than the mould spaces 58 in the left-hand mould half, (shown at the bottom), due to the fact that the core part 59 of the male mould parts 13a is smaller than the core part 60 of the male mould parts 14a.

While the grooves 55 and 56 are not illustrated in their entirety, and the precise routing of such channels or grooves is not critical to the invention, it is to be understood that the grooves 55, providing communication for the black moulding material from the unit 3 to the mould portions 13a, are dispoed within the movable mould half 11, while the groove 56 feeding the white moulding material from the inlet 52 to the moulding space 58, is disposed on the insert plate 10, as illustrated in FIGS. 4 and 5.

The mode of operation of the machine is described in greater detail in the following in connection with the moulding of keys for calculating machines, which keys are to comprise a black frame with white figures, the black mass being injected by unit 3 and the white mass by unit 4.

Subsequent to the locking of mould 9 the nozzles of the units are placed in the respective inlets 51 and 52 whereafter the injection of the black mass as well as of the white mass takes place simultaneously. Hereby it is to be observed, however, that the black mass only enters the mould spaces 57 and the white mass the mould spaces 58. Subsequent to the injection, afterpacking is carried out in known manner in order to compensate for material shrinkage and homogenization of the material. Thereafter follows cooling, which is started by a timer, and during the cooling of the mould new material is batched into the injection units 3 and 4. When after the cooling the timer has stopped, the mould is opened by displacement of the movable platen 17. Hereby the mould part 11 and the insert plate 10a with the male mould parts 13a and 14a remove together with the holding plate 16 and the platen from the fixed insert plate 10 with the female mould parts 13 and 14, which are provided with elevated figures and plane bottom, respectively. When the mould has been opened, the ejector mechanism starts for ejecting the moulded set located in the left-hand mould half (shown at the bottom of FIG. 2), which set as at the first injection is entirely white. Subsequent to the ejection of the moulded set, the transport cylinder 30 is started via impulses from an end contact on the ejector cylinders 41 so as so to feed the turnable mould part 11, that this is entirely free of the cores 59 and 60 projecting from the male mould parts 13a and 14a and can be turned. The mould set located on the right hand in FIG. 4 remains on the mould part 11. When the transport cylinder 30 has pushed ahead the mould part 11 a sufficient distance, the hydraulic cylinders 37 of the indexing means start by impulse from and end contact on the transport cylinder 30 so as to move the rack 35, which thereby turns the shaft 22 and the mould part 11 through 180°. Thereafter the transport cylinder 30 is again switched in in order to pull back the mould part 11, and the semimanufactured product moulded in the right-hand mould half now has been moved to the left-hand mould half. After the closing of the mould, a new working cycle can be started for injecting white mass into the transferred set of key frames and again to fill the through grooves 13 formed by the female mould parts 13 in the frame, so that white figures will be obtained.

The present invention is not restricted to the embodiment described above, but it may, of course, be used for the injection moulding of details other than keys for office machines and other machines provided with keys comprising two or more components. Thus, three, four or more injection units may be arranged, the moulds having to be constructed in view of the number of units. Furthermore, the stroke length of the hydraulic cylinders thereby must so be set that the mould part 11 is turned through 120°, 90° or an angle corresponding to the number of units.

What I claim is:

1. In a machine for successively injection moulding a plurality of materials or colours of a single material, said machine having a platen, a mould fastened to the platen, said mould having a plurality of mould sections and including a movable mould part, and means constituing a rotation axis, said movable mould part being rotatable about said rotation axis for presenting each of the mould sections successively to respective injection positions, the improvement comprising a plurality of injection units corresponding in number to the number of materials or colours and each simultaneously injecting one of the materials or colours into the respective one of the mould sections, one of said injection units being positioned axially with respect to the rotation axis of the movable mould part and the remainder of the injection units being positioned radially with respect to the rotation axis of the movable mould part, the mould having an injection opening for each injection unit, the injection opening for the axially positioned injection unit being conincident with the rotation axis whereby the injection opening for the axially positioned injection unit is constantly in registry with the axially positioned injection unit, said rotation axis being constituted by a rotatable and axially movable shaft, means detachably connecting the movable mould part to the shaft, power means operably related to said shaft for moving said shaft axially, an indexing means connected to the movable mould part via the shaft for producing stepwise rotation of the movable mould part, following each injection of material from said injection units, to present each mould section to the next successive injection unit, and means to eject the moulded material from one of said mould sections following moulding of material from all said injection units into said one mould section, said indexing means including a gear wheel, means slidably connecting the gear wheel on said shaft so that said shaft can be moved axially, relative to said gear wheel, a movable rack with which said gear wheel meshes, and power means operably related to said rack for moving the rack and via said gear wheel and shaft rotating said movable mould part in response to said means to eject the molded material.

* * * * *